United States Patent
Wang et al.

(10) Patent No.: US 8,052,206 B2
(45) Date of Patent: Nov. 8, 2011

(54) FLOORBOARD ASSEMBLY FOR VEHICLE

(75) Inventors: Xiangzheng Wang, Shenzhen (CN); Xiaoliang Shang, Shenzhen (CN)

(73) Assignee: BYD Company, Ltd., Shenzhen (CN)

( * ) Notice: Subject to any disclaimer, the term of this patent is extended or adjusted under 35 U.S.C. 154(b) by 0 days.

(21) Appl. No.: 12/742,641

(22) PCT Filed: May 26, 2008

(86) PCT No.: PCT/CN2008/071086
§ 371 (c)(1),
(2), (4) Date: May 12, 2010

(87) PCT Pub. No.: WO2009/062405
PCT Pub. Date: May 22, 2009

(65) Prior Publication Data
US 2010/0264699 A1 Oct. 21, 2010

(30) Foreign Application Priority Data
Nov. 15, 2007 (CN) .......................... 2007 1 0187250

(51) Int. Cl.
*B60J 7/00* (2006.01)
(52) U.S. Cl. .................. 296/193.07; 280/783; 180/68.5
(58) Field of Classification Search ............. 296/187.08, 296/193.07, 37.1; 180/68.5; 280/783
See application file for complete search history.

(56) References Cited

U.S. PATENT DOCUMENTS

| | | | | |
|---|---|---|---|---|
| 5,378,555 A | * | 1/1995 | Waters et al. | 429/97 |
| 5,704,644 A | * | 1/1998 | Jaggi | 280/796 |
| 7,540,343 B2 | * | 6/2009 | Nakashima et al. | 180/65.1 |
| 2006/0113131 A1 | | 6/2006 | Kato et al. | 180/65.3 |
| 2007/0007054 A1 | | 1/2007 | Nakashima et al. | 180/65.1 |
| 2007/0007060 A1 | | 1/2007 | Ono et al. | 180/65.3 |

FOREIGN PATENT DOCUMENTS

| | | |
|---|---|---|
| CN | 1380215 A | 11/2002 |
| CN | 1668499 A | 9/2005 |
| CN | 1886279 A | 12/2006 |
| WO | WO 2005/102759 A1 | 11/2005 |

OTHER PUBLICATIONS

International Search Report issued in PCT/CN2008/071086, Aug. 14, 2008, by ISA/CN, 7 pages.

* cited by examiner

*Primary Examiner* — Joseph Pape
(74) *Attorney, Agent, or Firm* — Morgan, Lewis & Bockius LLP

(57) ABSTRACT

A floorboard assembly for vehicle, comprising a front floorboard (2) and a middle floorboard (6) that are connected in a fixed manner or formed integrally, wherein, the front floorboard (2) is in ridge shape, roughly flat at both sides and raised in the middle, the raised part in the middle defines a cavity which is suitable for accommodating a battery for vehicle. In the floorboard assembly for vehicle provided in the present invention, the middle channel part of the front floorboard (2) is raised, and a high capacity battery can be placed in the cavity defined by the raised part in the middle; in that way, the space utilization ratio for floorboard is higher, the battery pack can be installed and maintained conveniently, and the gravity center of the vehicle is stable.

8 Claims, 5 Drawing Sheets

FLOORBOARD ASSEMBLY FOR VEHICLE

CROSS REFERENCE TO RELATED APPLICATIONS

This Application is a United States National Stage Application filed under 35 U.S.C. §371 of PCT Patent Application Serial No. PCT/CN2008/071086 filed on May 26, 2008 which claims benefit of and priority to Chinese Patent Application Serial No. 200710187250.0 filed Nov. 15, 2007, the disclosures of all of which are hereby incorporated by reference in their entirety.

FIELD OF THE INVENTION

The present invention relates to a floorboard assembly for vehicle, in particular to a floorboard assembly that is especially suitable for hybrid power vehicles or electric vehicles.

BACKGROUND OF THE INVENTION

In any hybrid power vehicle or electric vehicle, a battery heavy in weight and large in size has to be provided, which causes severely increased weight of the vehicle. The existing fuel-fired vehicle body can't meet the requirement of hybrid power vehicle or electric vehicle in structure and intensity, therefore, corresponding components of the vehicle body must be improved further. The existing floorboard assembly for vehicle usually comprises a front floorboard, a middle floorboard, a rear floorboard, and a variety of mounting brackets fixed to the floorboard. Usually, the part from the front wall panel to the rear seat board is referred to the front floorboard, the part from the rear seat board to the luggage compartment is referred to the middle floorboard, and the part behind the luggage compartment is referred to the rear floorboard. The front floorboard is roughly in flat shape and is slightly raised in the middle for arranging a shift control, a hand brake and auxiliary instrument panel, and is welded with the front wall panel for vehicle together; a mounting bracket for the shift control assembly, a mounting bracket for the auxiliary instrument panel, and rear mounting brackets for the seats, etc. are fixed. The existing low-capacity and small-size battery usually can be arranged in the vehicle, i.e., below or behind the rear seats. However, since the battery capacity is low, such a hybrid power vehicle has short travel mileage. In order to increase the travel mileage of the hybrid power or electric vehicles, a high-capacity battery must be provided, which will cause increased weight and volume of the battery pack inevitably; if the battery is arranged in the vehicle, it will occupy a large space in the vehicle, and the installation and maintenance of the battery will be inconvenient, and the gravity center of the vehicle will not be stable.

SUMMARY OF THE INVENTION

An object of the present invention is to provide a floorboard assembly for vehicle, which is designed to meet the demand of hybrid power vehicles or electric vehicles for high-capacity battery; in addition, the space utilization ratio for floorboard can be improved, the battery pack can be installed and maintained conveniently, and the gravity center of the vehicle is stable.

The floorboard assembly for vehicle provided in the present invention comprises a front floorboard and a middle floorboard that are connected in a fixed manner or formed integrally, wherein, the front floorboard is in ridge shape with roughly flat parts at both sides and a raised part in the middle, the raised part in the middle defines a cavity which is suitable for accommodating batteries for vehicle.

In the floorboard assembly for vehicle provided in the present invention, the middle channel part of the front floorboard is raised, and a high capacity battery can be placed in the cavity defined by the raised part in the middle, and the roughly flat parts at both sides can be used to arrange seats and provide spaces for the feet of the passengers sited on the rear seats; in that way, the space of the middle channel inside the vehicle can be utilized fully, without affecting the arrangement of the seats and the spaces for the feet of the passengers sited on the rear seats; therefore, the space utilization ratio for floorboard is higher, the battery pack can be installed and maintained conveniently, and the gravity center of the vehicle is stable.

BRIEF DESCRIPTION OF THE REFERENCE SIGNS

Figure 1:
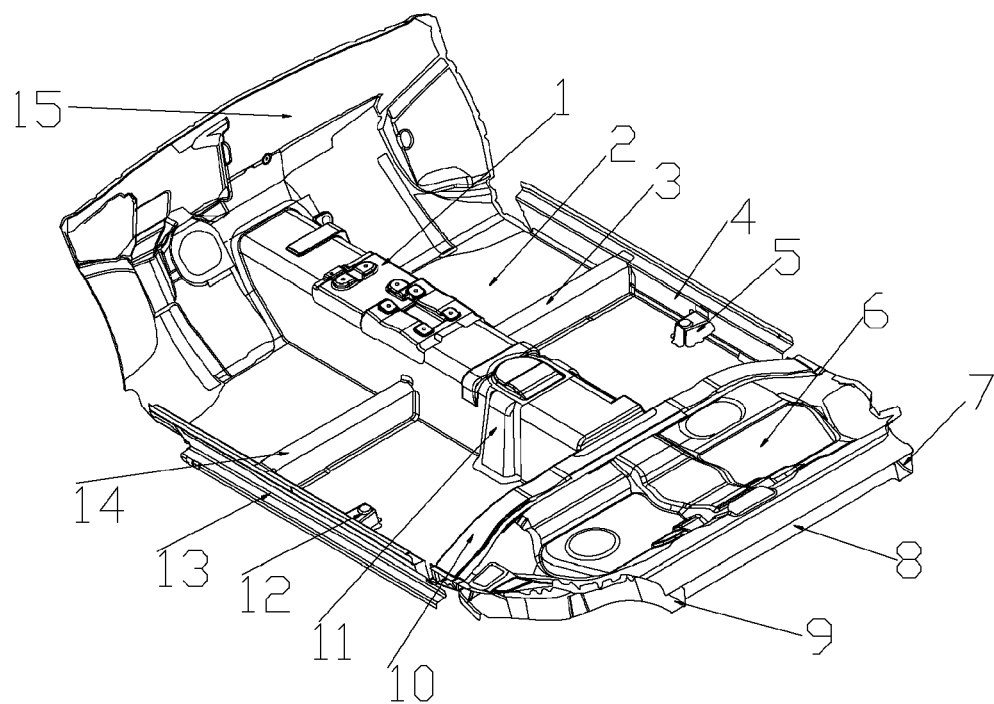
FIG. 1 is a front axonometric drawing of the floorboard assembly for vehicle provided in the present invention.

1 Mounting bracket for shift control assembly
2 Front floorboard
3 Front mounting beam for right seat
4 Right door sill beam
5 Rear mounting bracket for right seat
6 Middle floorboard
7 Right longitudinal beam for rear floorboard
8 Bottom beam for middle floorboard
9 Left longitudinal beam for rear floorboard
10 Bottom beam for front floorboard
11 Mounting bracket for auxiliary instrument panel
12 Rear mounting bracket for left seat
13 Left door sill beam
14 Front mounting beam for left seat
15 Front wall panel
16 First reinforcing beam
17 Second reinforcing beam
18 Third reinforcing beam
19 Front section of right longitudinal beam
20 Front section of left longitudinal beam
21 First cross beam 22 Second cross beam
23 Third cross beam
24 Fourth cross beam
25 Middle section of left longitudinal beam
26 Middle section of right longitudinal beam
27 Fifth cross beam
28 Sixth cross beam
29 Seventh cross beam
30 Eighth cross beam
31 Fourth reinforcing beam
32 Rear section of left longitudinal beam
33 Fifth reinforcing beam
34 Sixth reinforcing beam
35 Seventh reinforcing beam
36 Chamber

DETAILED DESCRIPTION OF THE EMBODIMENTS

Hereafter the embodiments of the present invention will be further described in detail with reference to the accompanying drawings.

As shown in FIGS. 1-4, the floorboard assembly for vehicle provided in the present invention comprises a front floorboard 2 and a middle floorboard 6 that are connected in a fixed manner or formed integrally, wherein, the front floorboard 2 is in ridge shape with roughly flat parts at both sides and a raised part in the middle, the raised part in the middle defines a cavity which is suitable for accommodating batteries for vehicle.

In the floorboard assembly for vehicle provided in the present invention, the middle channel part of the front floorboard 2 is raised, and a high capacity battery can be placed in the cavity defined by the raised part in the middle, and the roughly flat parts at both sides can be used to arrange seats and provide spaces for the feet of the passengers sited on the rear seats; in that way, the space of the middle channel inside the vehicle can be utilized fully, without affecting the arrangement of the seats and the spaces for the feet of the passengers sited on the rear seats; therefore, the space utilization ratio for floorboard is higher, the battery pack can be installed and maintained conveniently, and the gravity center of the vehicle is stable.

Figure 2:
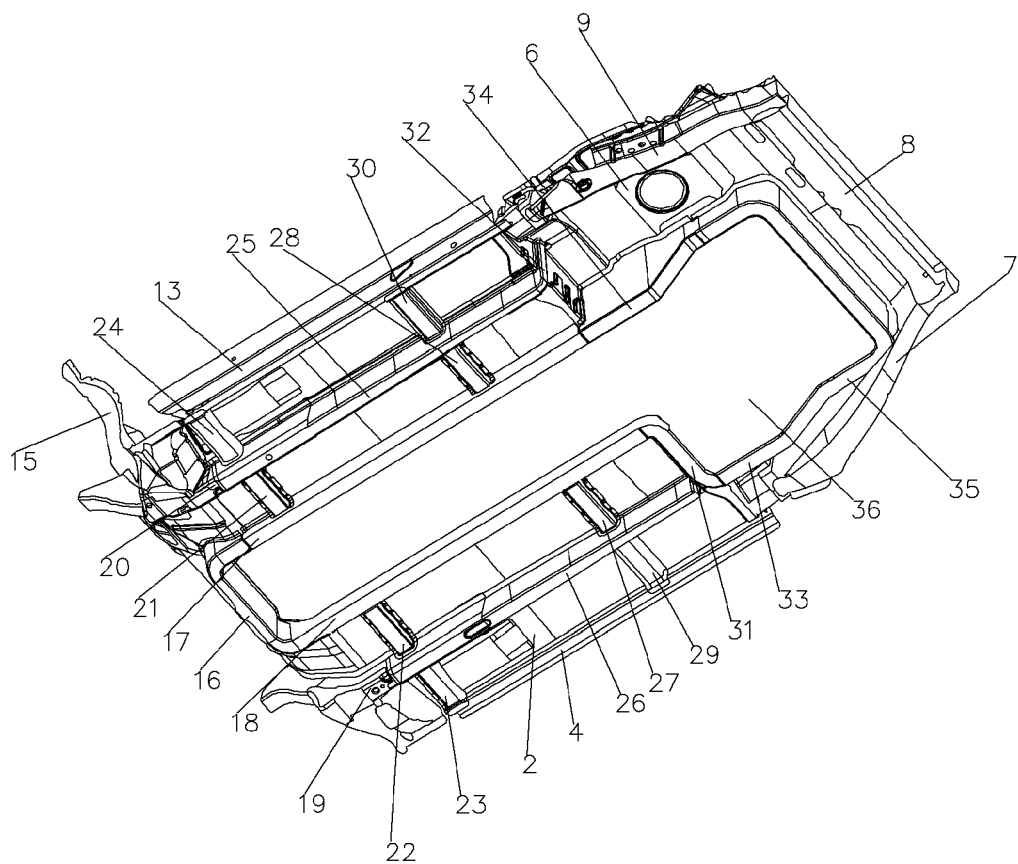
FIG. 2 is a bottom axonometric drawing of the floorboard assembly for vehicle provided in the present invention.
Figure 3:
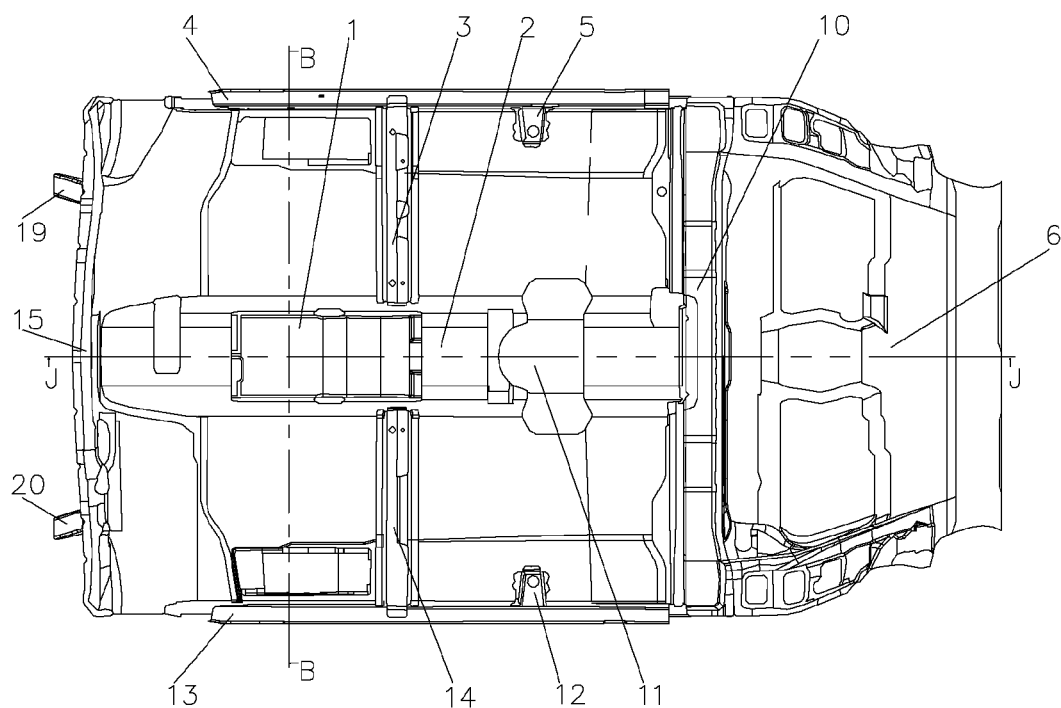
FIG. 3 is a top view of the floorboard assembly for vehicle shown in FIG. 1.

Preferably, as shown in FIG. 1 and FIG. 2, at least a part of the middle floorboard 6 is formed as a higher part which is higher than the flat parts at both sides of the front floorboard 2, and a space defined by the higher part of the middle floorboard 6 is suitable for accommodating batteries for vehicle. In that way, the space for accommodating the batteries for vehicle is further increased, and therefore more batteries or a battery with higher capacity can be arranged within the vehicle.

Figure 4:
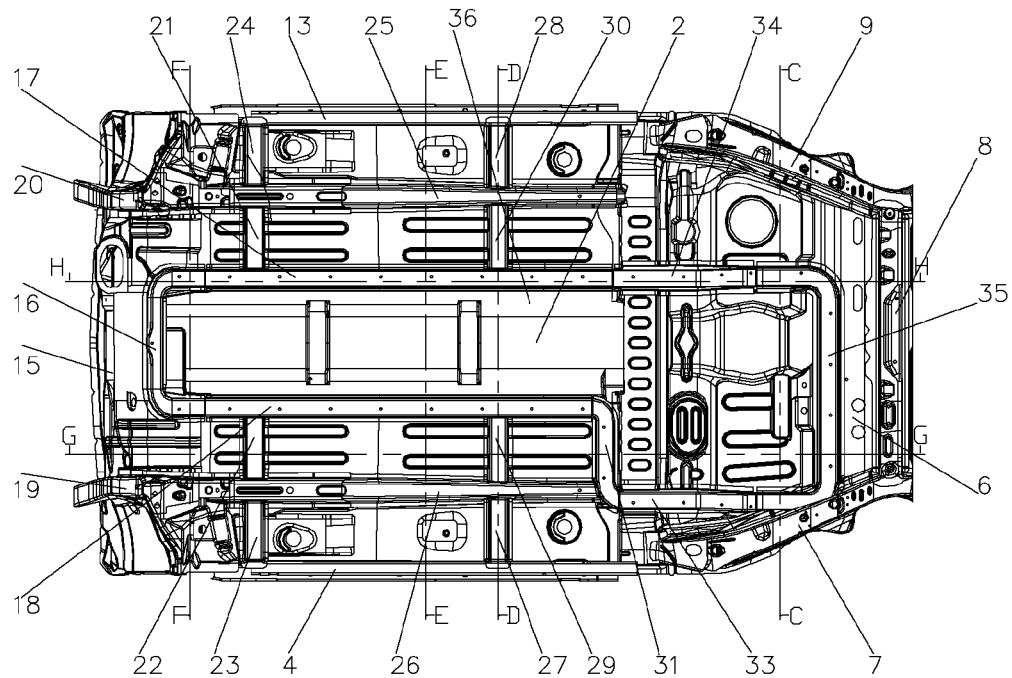
FIG. 4 is a bottom view of the floorboard assembly for vehicle shown in FIG. 1.
Figure 5:
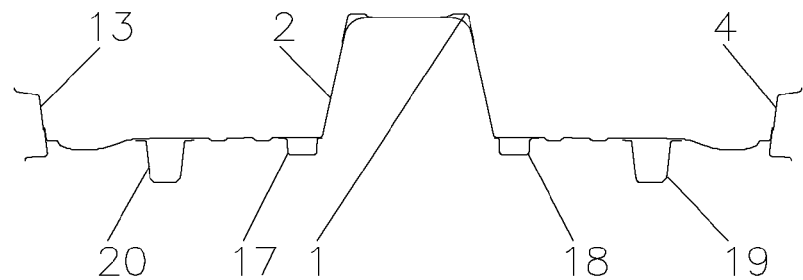
FIG. 5 is a cross-sectional view of the floorboard assembly for vehicle taken along a line B-B shown in FIG. 3.
Figure 6:
FIG. 6 is a cross-sectional view of the floorboard assembly for vehicle taken along a line J-J shown in FIG. 3.
Figure 7:
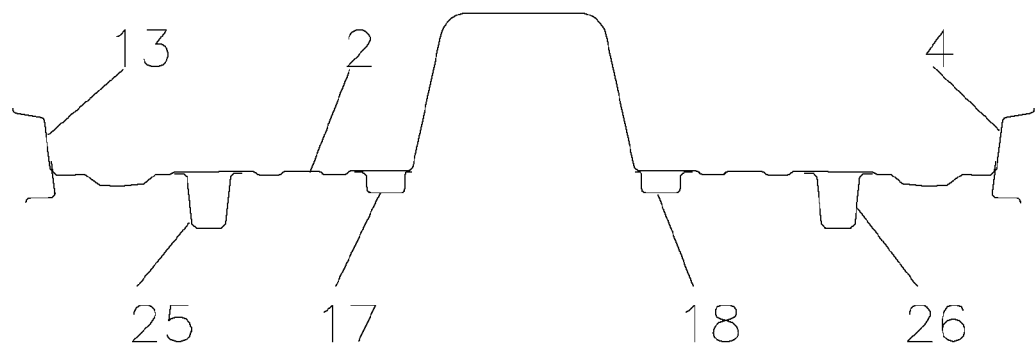
FIG. 7 is a cross-sectional view of the floorboard assembly for vehicle taken along a line E-E shown in FIG. 4.
Figure 8:
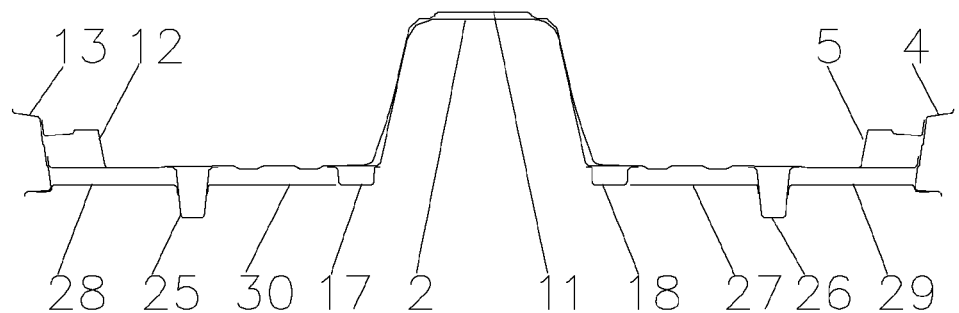
FIG. 8 is a cross-sectional view of the floorboard assembly for vehicle taken along a line D-D shown in FIG. 4.
Figure 9:
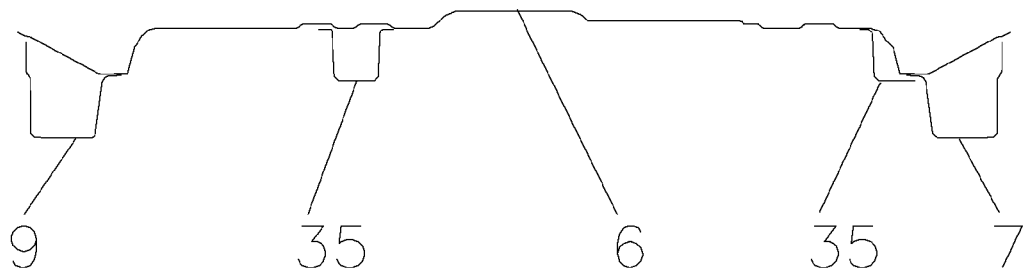
FIG. 9 is a cross-sectional view of the floorboard assembly for vehicle taken along a line C-C shown in FIG. 4.
Figure 10:
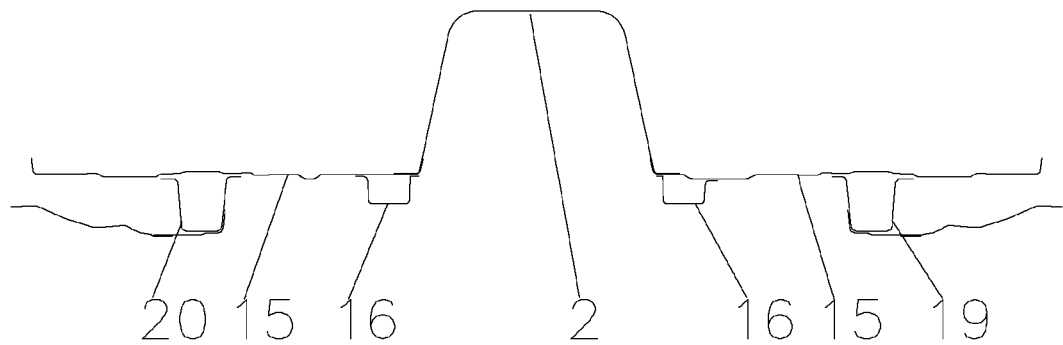
FIG. 10 is a cross-sectional view of the floorboard assembly for vehicle taken along a line F-F shown in FIG. 4.
Figure 11:
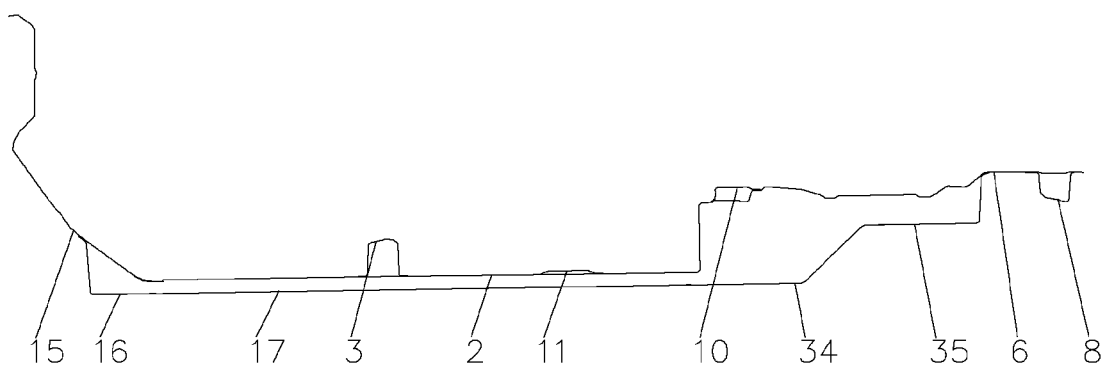
FIG. 11 is a cross-sectional view of the floorboard assembly for vehicle taken along a line H-H shown in FIG. 4.
Figure 12:
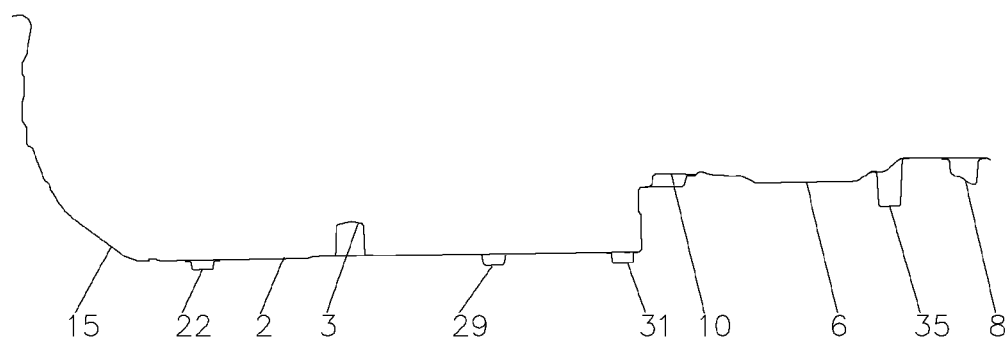
FIG. 12 is a cross-sectional view of the floorboard assembly for vehicle taken along a line G-G shown in FIG. 4.

More preferably, as shown in FIG. 2 and FIG. 4, the cavity defined by the raised part in the middle of the front floorboard 2 is communicated with at least a part of the space defined by the higher part of the middle floorboard 6 as shown in FIG. 1 and thereby a chamber 36 is formed. Therefore, the vehicle's battery can be placed within the chamber 36. The chamber 36 is located in the middle of the bottom of the vehicle body, away from the front or rear impact deformation area; in addition, the front end of the chamber 36 is narrow and long and is arranged in the middle of the floorboard, away from the left or right impact deformation area. The chamber 36 may be in L- or T-shape; in an embodiment, as shown in FIG. 2 or FIG. 4, the chamber 36 is in L-shape.

More preferably, a reinforcing beam is fixed on the circumference of the bottom edge of the chamber 36. The reinforcing beam may be used for increasing the strength of the floorboard assembly and providing protection for the battery.

The reinforcing beam may be in an integral structure or in a sectional structure; in an embodiment, as shown in FIG. 2 and FIG. 4, the reinforcing beam comprises a first reinforcing beam 16, a second reinforcing beam 17, a third reinforcing beam 18, a fourth reinforcing beam 31, a fifth reinforcing beam 33, a sixth reinforcing beam 34, and a seventh reinforcing beam 35 that are connected in sequence.

More preferably, a sealant is applied between the reinforcing beams and the bottom edge of the chamber 36. In that way, when the battery is placed into the chamber 36, the sealant provides good sealing effect between the bottom of the battery pack and the cavity 36, so as to prevent the intrusion of dust, water and foreign matters into the battery pack, and thereby to protect the battery.

A plurality of longitudinal beams (19, 20, 25, 26, 32) and cross beams (21, 22, 23, 24, 27, 28, 29, 30) can be arranged below the floorboards, so as to improve the strength and impact resistance of the floorboard; in an embodiment, as shown in FIG. 2, FIG. 4, and FIGS. 5-12, a left door sill beam 13 below a left door sill, a right door sill beam 4 below a right door sill, a left longitudinal beam (20, 25, 32) between the left door sill beam 13 and the reinforcing beam, and a right longitudinal beam (19, 26) between the right door sill beam 4 and the reinforcing beam are arranged below the flat parts at both sides of the front floorboard 2, and a plurality of cross beams (21, 22, 23, 24, 27, 28, 29, 30) perpendicular to the left longitudinal beam (20, 25, 32) and the right longitudinal beam (19, 26) are arranged between the left door sill beam 13 and the left longitudinal beam (20, 25, 32), between the left longitudinal beam (20, 25, 32) and the reinforcing beam, between the right door sill beam 4 and the right longitudinal beam (19, 26), and between the right longitudinal beam (19, 26) and the reinforcing beam.

The left longitudinal beam (20, 25, 32) and the right longitudinal beam (19, 26) may be in an integral structure or sectional structure; as shown in FIG. 2 and FIG. 4, the left longitudinal beam (20, 25, 32) comprises a front section 20 of left longitudinal beam, a middle section 25 of left longitudinal beam, and a rear section 32 of left longitudinal beam; the right longitudinal beam (19, 26) comprises a front section 19 of right longitudinal beam and a middle section 26 of right longitudinal beam. In case of frontal impact, the left longitudinal beam and the right longitudinal beam can transfer the frontal impact force backwards, so as to prevent the front floorboard 2 and the front wall panel 15 of the vehicle from deformation and restrict the amount of deformation on the longitudinal beam for front compartment as far as possible, and thereby protect passengers' safety. The height of the left longitudinal beam and right longitudinal beam can be designed appropriately so that the height of the left longitudinal beam and right longitudinal beam is lower than the height of the bottom of the battery pack, and thereby the left longitudinal beam and the right longitudinal beam can play a role of crashworthy post; in that way, in case that the bottom of the vehicle encounters any protrusions on the ground, the left longitudinal beam and the right longitudinal beam can protect the bottom of the battery pack from impact.

The cross beams can improve the rigidity and strength of the floorboard, so as to increase the strength of the entire vehicle; in addition, they can absorb and transfer impact force applied on both sides of the vehicle body. The number and positions of the cross beams can be arranged as required; for example, as shown in FIG. 2 and FIG. 4, the cross beams comprise a first cross beam 21, a second cross beam 22, a third cross beam 23, a fourth cross beam 24, a fifth cross beam 27, a sixth cross beam 28, a seven cross beam 29, and a eighth cross beam 30, wherein, the first cross beam 21, the fourth cross beam 24, the sixth cross beam 28 and the eighth cross beam 30 are fixed to the left door sill 13, the front section of left longitudinal beam 20, the middle section of left longitudinal beam 25, the second reinforcing beam 17 and the front floorboard 2 respectively; the second cross beam 22, the third cross beam 23, the fifth cross beam 27 and the seventh cross beam 29 are welded to the right door sill beam 4, the front section of right longitudinal beam 19, the middle section of right longitudinal beam 26, the third reinforcing beam 18 and the front floorboard 2 respectively.

Each section of reinforcing beams, the reinforcing beams, the longitudinal beams, and the cross beams can be connected or fixed in a variety of ways known in the art, and are usually connected or fixed by welding.

When the floorboard assembly for vehicle is used, the front floorboard 2 is usually welded with the front wall panel 15 of the vehicle. The front mounting beam for right seat 3 and the front mounting beam for left seat 14 are welded to the front floorboard 2 and the right and left door sill beam 4, 13 respectively. The mounting bracket for shift control assembly 1 and the mounting bracket for auxiliary instrument panel 11 are welded to the front floorboard 2. The rear mounting bracket for right seat 5 and the rear mounting bracket for left seat 12 are welded to the front floorboard 2 and the right and left door sill beam 4, 13 respectively. The middle floorboard 6 is welded to the front floorboard 2 by means of the bottom beam for front floorboard 10, the bottom beam for middle floorboard 8, the right longitudinal beam for rear floorboard 7 and the left longitudinal beam for rear floorboard 9 are welded with the middle floorboard 6, the right door sill beam 4 and the left door sill beam 13. The reinforcing beams are usually welded with the front wall panel 15, the front floorboard 2, the bottom beam for front floorboard 10 and the middle floorboard 6.

The invention claimed is:

1. A floorboard assembly for a vehicle, comprising:
    a front floorboard; and
    a middle floorboard that is connected to the front floorboard in a fixed manner or formed integrally with the front floorboard,
    wherein:
        the front floorboard is in a ridge shape with a raised part in the middle and roughly flat parts at opposite sides of the raised part so as to define a substantially longitudinal cavity under the front floorboard;
        at least a part of the middle floorboard that is longitudinally behind a corresponding one of the roughly flat parts of the front floorboard is raised to be higher than the corresponding flat part of the front floorboard so as to define a substantially latitudinal cavity under the middle floorboard;
        the substantially longitudinal cavity under the front floorboard and the substantially latitudinal cavity under the middle floorboard are combined into a single chamber for housing a plurality of vehicle batteries, wherein a top view of the chamber has a substantially two-dimensional footprint; and
        the chamber has a bottom edge and a closed-loop reinforcing beam having the substantially two-dimensional footprint is affixed on the bottom edge of the chamber to protect the plurality of vehicle batteries.

2. The floorboard assembly according to claim 1, wherein the substantially two-dimensional footprint of the chamber is in an L-shape.

3. The floorboard assembly according to claim 1, wherein the closed-loop reinforcing beam comprises a plurality of serially connected reinforcing beams.

4. The floorboard assembly according to claim 3, wherein the plurality of serially connected reinforcing beams include seven reinforcing beams.

5. The floorboard assembly according to claim 1, wherein a sealant is applied between the closed-loop reinforcing beam and the bottom edge of the chamber.

6. The floorboard assembly according to claim 1, further comprising:
    a left door sill beam located below a left door sill adjacent a left side of the front floorboard and
    a right door sill beam located below a right door sill adjacent a right side of the front floorboard.

7. The floorboard assembly according to claim 6, further comprising:
    a left longitudinal beam located between the left door sill beam and the closed-loop reinforcing beam and
    a right longitudinal beam located between the right door sill beam and the closed-loop reinforcing beam and
    wherein the left and right longitudinal beams are located below the respective flat parts at the opposite sides of the front floorboard.

8. The floorboard assembly according to claim 7, further comprising:
    a plurality of cross beams located between the left door sill beam and the left longitudinal beam and a plurality of cross beams located between the left longitudinal beam and the closed-loop reinforcing beam, and
    a plurality of cross beams located between the right door sill beam and the right longitudinal beam and a plurality of cross beams located between the right longitudinal beam and the closed-loop reinforcing beam,
    wherein the pluralities of cross beams are perpendicular to the left and right longitudinal beams.

* * * * *